R. Eastman,
Dressing Stone.
N°. 9,132.   Patented July 20, 1852.
2 Sheets–Sheet 1.
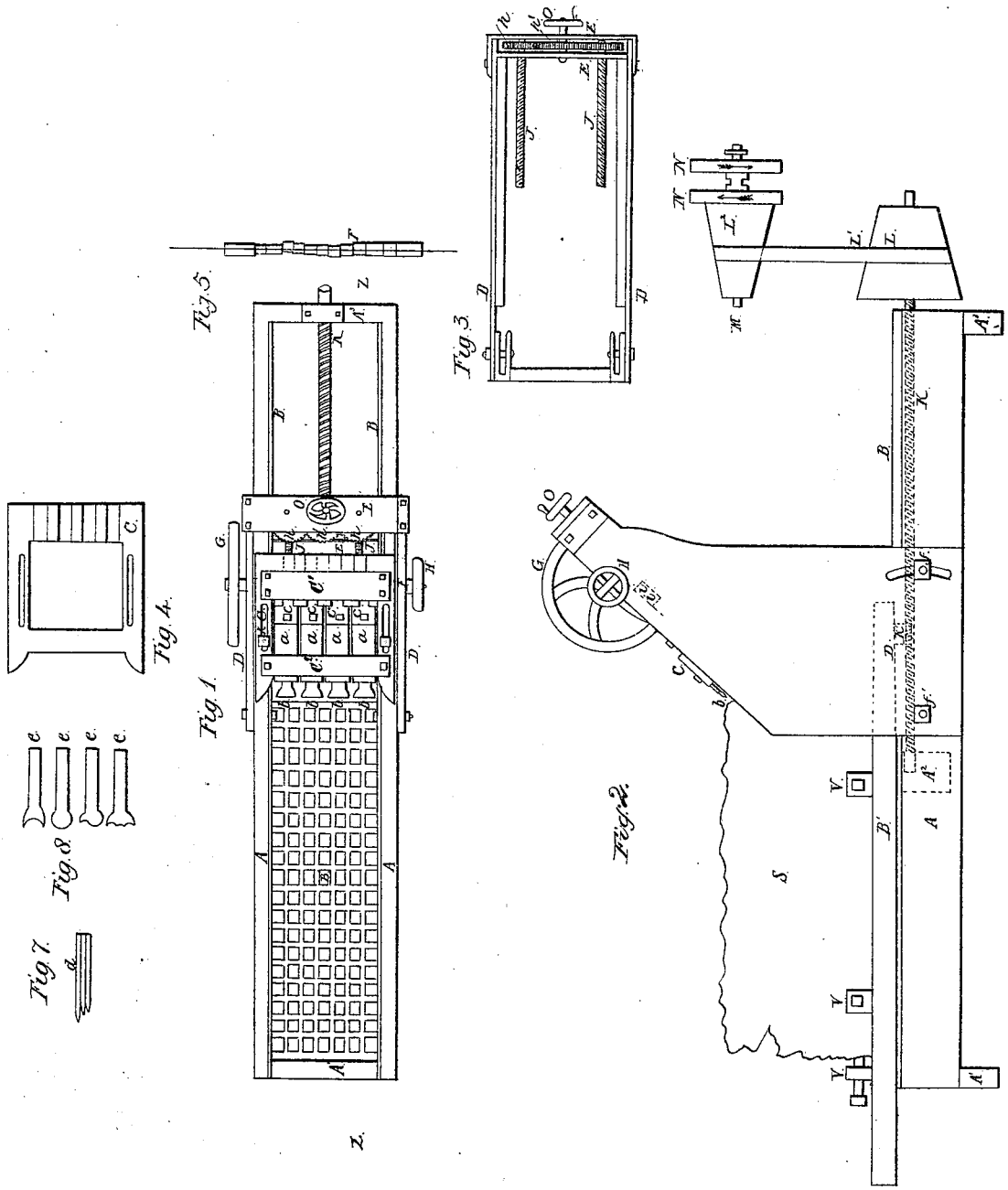

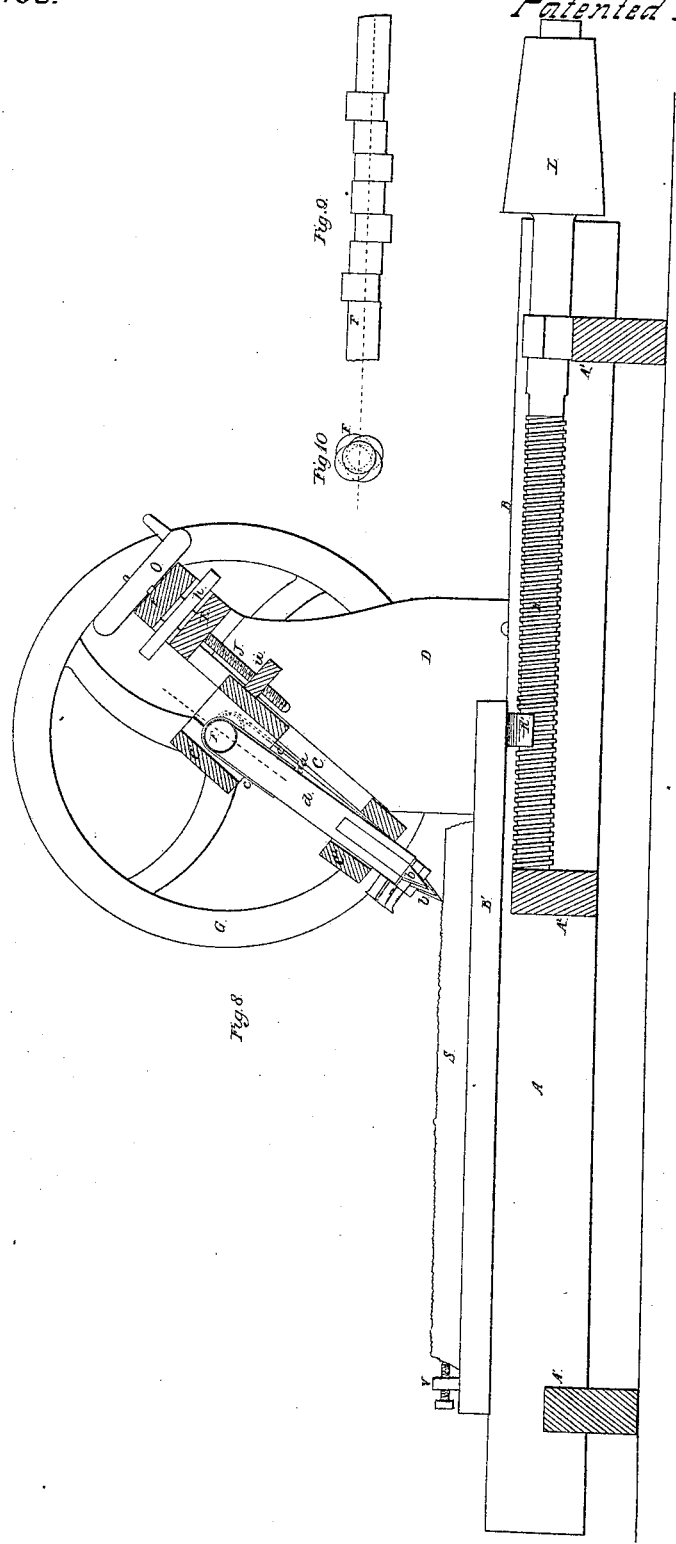

UNITED STATES PATENT OFFICE.

ROBERT EASTMAN, OF CONCORD, NEW HAMPSHIRE, ASSIGNOR TO SETH EASTMAN, OF WASHINGTON, DISTRICT OF COLUMBIA.

MACHINE FOR DRESSING STONE.

Specification of Letters Patent No. 9,132, dated July 20, 1852.

*To all whom it may concern:*

Be it known that I, ROBERT EASTMAN, of Concord, in the county of Merrimack and State of New Hampshire, have invented certain new and useful Improvements in Machines for Dressing or Working Stone and other Materials; and I do hereby declare that the same is described and represented in the following specification and accompanying drawings.

The nature of my invention consists in dressing or working the stone or other material by forcing the chisels, picks or cutters against it by a positive crank motion, so that they cut with a steady positive motion under the combined action of the crank instead of cutting with a blow.

To enable others skilled in the art to make and use my invention I will proceed to describe its construction and operation, referring to the accompanying drawings, in which the same letters indicate like parts in all the figures.

Figure 1 is a top view. Fig. 2 is a side elevation. Fig. 8 is a sectional elevation through the line Z, Z of Fig. 1. The other figures will be referred to hereafter.

A, A are two parallel bars connected by the girts $A^1$, $A^2$, $A^3$ for the bottom bed or frame upon which the ways B, B are fastened. The carriage B' is fitted to these ways and is traversed by the screw K acting upon the nut $K^1$ fastened to the carriage. The screw K turns in bearings in the girts $A^2$, $A^3$ and may have a conical pulley L upon it turned by the belt $L^1$ from the pulley $L^2$ upon the shaft M, which shaft has two loose pulleys upon it N, N with a clutch to operate between them; one of these pulleys is turned in one direction and the other in an opposite direction by belts so as to traverse the carriage either way.

D, D are two upright side pieces bolted to A, A by the bolts $f$, $f^1$, a curved slot being made for the bolt $f$ so as to set the side pieces D, D at the angle desired; these pieces are connected at the top by the bars E, E Fig. 3, between which bars there are three gears $h$, $h$, $h^1$, and by turning the hand wheel O upon the shaft of $h^1$ the screws J, J are turned which traverse the cutter carriage C upon the pieces D, D (by the nuts $i$, $i$ fastened to it) so as to adjust the cutters to the desired position to operate upon the stone S; when the carriage is so adjusted it is secured by the bolts $k$ $k$; the frame of the carriage C is represented in Fig. 4. The crank shaft F is fitted to this frame and secured by the cap $C^1$ so as to turn when operated by a belt upon the pulley H; upon the opposite end of the shaft F there is a fly wheel G to equalize the motion.

The shaft F, Figs. 5, 9 and 10 has four cranks at equal distances from each other and all at the same distance from the axis of the shaft, so that the chisels act one at a time in regular succession a part being drawn back while the rest are moving forward or down upon the stone; and between each two cranks there is a bearing fitted to the carriage to prevent the shaft from springing. The chisel stocks $a$, $a$, $a$, $a$ are connected to the crank by the straps $c$, $c$ which are fastened to the stocks by the bolts $c^1$, $c^1$ so as to receive a positive motion both ways from the crank. The chisel stocks rest upon the frame of the carriage C C and are held in their proper positions by the cap bar $C^2$. These chisel shocks have sockets in them into which the shanks of the chisels $b$, $b$, $b$, $b$ are inserted and secured by a set screw or otherwise so as to adjust the edges to a straight line or otherwise as may be required and so as to move them out as they become shortened by wear and sharpening, and the edges of the chisels may be adapted to the form to be cut as represented at $e$, $e$, $e$, $e$ Fig. 6, and several tools may be formed so as to fit into one socket at the same time and thus operate with several effective edges at once as shown at $d$ Fig. 7.

To put the machine at work a stone should be secured upon the carriage B by the fixtures $v$, $v$ or in some other way; the chisels being properly arranged in their sockets and the carriage C adjusted in a proper position by the screws J, J and secured by the bolts $k$, $k$ the shaft F is turned to operate the cutters, and the screw K being turned at the same time the carriage is traversed so as to pass the stone under the chisels, which may be made to remove the higher protuberances first and then the carriage may be readjusted and the stone passed under the cutters again to cut off another portion, and this operation may be repeated until the desired effect in reducing the thickness or smoothing or shaping the surface has been produced; when one side has been finished, by turning the stone another may be presented to the action of the cutters and so on till the whole is completed.

If the stone is cut while it is traversed toward the pulleys L, L the chisels may be beveled on both sides but if it is to be cut while it is traversed from these pulleys the chisels should be made straight or curved on the under side and beveled upon the top.

What I claim as new and desire to secure by Letters Patent in the within described machine for dressing stone and for facing, reeding, fluting and cutting moldings upon stone is—

The operating of one or more chisels or tools by a crank or cranks or their equivalents which by their combined action upon said tools thrust or force them against the stone or other material to be worked substantially as described.

In testimony whereof, I have hereunto signed my name before two subscribing witnesses.

ROBERT EASTMAN.

Witnesses:
JOHN I. EASTMAN,
CAROLINE O. EASTMAN.